Nov. 20, 1962  L. F. GILBERT  3,064,475
SOLIDS FLOW METER
Filed Nov. 23, 1959  3 Sheets-Sheet 1

INVENTOR.
LYMAN F. GILBERT
BY
John F. Luhrs
ATTORNEY

Nov. 20, 1962  L. F. GILBERT  3,064,475
SOLIDS FLOW METER
Filed Nov. 23, 1959  3 Sheets-Sheet 2

INVENTOR.
LYMAN F. GILBERT
BY John F. Luhrs
ATTORNEY

United States Patent Office 3,064,475
Patented Nov. 20, 1962

3,064,475
SOLIDS FLOW METER
Lyman F. Gilbert, Lyndhurst, Ohio, assignor to Bailey Meter Company, a corporation of Delaware
Filed Nov. 23, 1959, Ser. No. 854,916
4 Claims. (Cl. 73—231)

This invention relates to apparatus for measuring the flow of fluid solids such as crushed or pulverized coal and rock, fly ash, grain, ore, catalyst, dry slurry, cement and the like; and more particularly to the primary sensing element used in such apparatus.

Generally, a fluid solid is transported, at least in part, through a large circular pipe or conduit arranged vertically or inclined therefrom through which the fluid solid flows by gravity while maintaining the conduit substantially full, at least in the portion of length at which the metering action takes place. Ordinarily, the velocity of the fluid solid is relatively low although in some instances will approach free fall velocity, as for example, as may be the case with catalyst such as used in oil refineries and the like.

Various types of primary measuring elements have been used to measure the flow of fluid solids. Perhaps the most common type is a rotatable vane which is located in the conduit and which rotates at a rate more or less proportional to the rate at which the fluid solid flows. Solids flow meters employing a rotatable vane are disclosed, for example, in United States patents to O. D. Havard Numbers 943,405 and 1,040,537; and in a United States patent to E. G. Bailey Number 1,425,936. It is evident that knowing the number of revolutions of the vane in a given period of time the total quantity of fluid solids passing through the conduit in that period of time can be calculated; or by converting the angular velocity of the vane to an indication of rate, the rate of flow of the fluid solid can be calculated.

As will be apparent from a study of the Havard and Bailey patents the vane may take various shapes; however, I have found the helical vane, as disclosed by Bailey, to be preferable over the flat paddle wheel type such as disclosed by Havard. Helical vanes such as disclosed by Bailey, have in the past, been subject to several conditions which limit their accuracy. One of the most serious conditions is the build-up and caking of the fluid solid on the surface of the vane causing a change in the effective area of the conduit and causing the vane to impart an angular velocity component to the fluid solid. Another prevalent condition has been the "rat holing" of the fluid solid around the vane which in addition to changing the effective area of the conduit causes a change in the ratio between the angular velocity of the vane and the axial velocity of the fluid solid along the conduit. A further undesirable condition has been the friction load on the vane imposed by the mechanism used to transmit the vane rotation to the exterior of the conduit. Such friction load also causes the vane to impart an angular velocity component to the fluid solid variable in proportion to variations in the friction load.

It is a principal object of this invention to provide an improved helical vane assembly for measuring the flow rate of a fluid solid through a conduit.

Another object of the invention is to eliminate the caking and sticking of the fluid solid on the surface of the vane.

Still another object of the invention is to prevent sticking and clogging of the bearing associated with a rotatable measuring vane.

An additional object of the invention is to continuously purge the bearings associated with a rotatable vane by air under pressure to prevent clogging of the bearings by foreign matter which imposes a variable friction load on the vane.

Other objects and advantages will become apparent from the following description taken in connection with the accompanying drawings in which.

Figure 1:
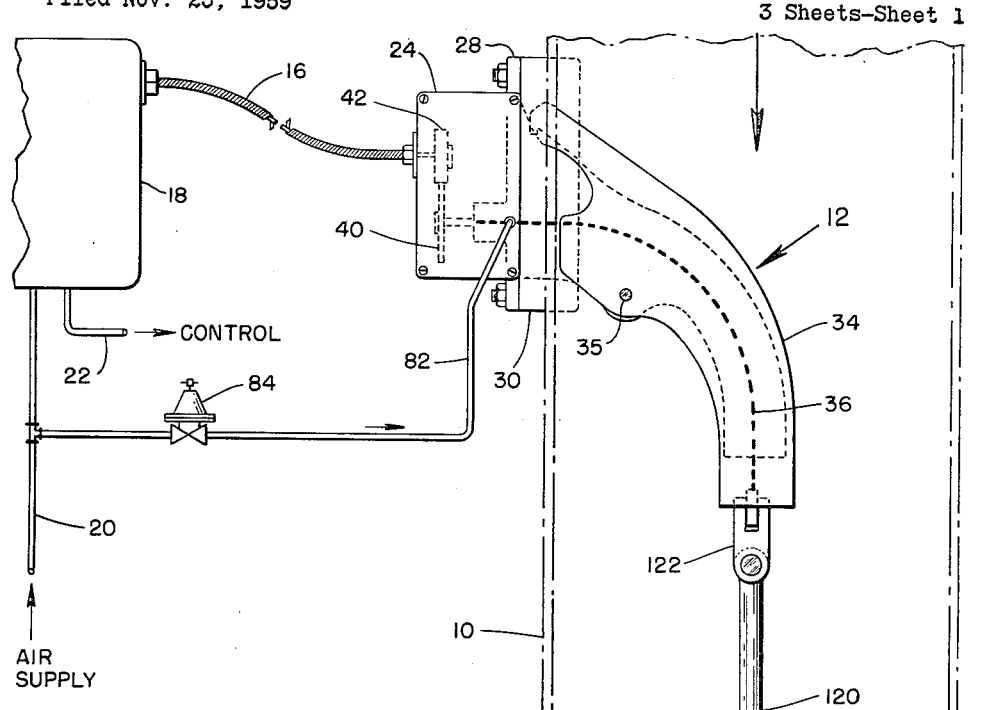
FIG. 1 is a schematic illustration of a fluid solids flow measuring apparatus embodying the invention.
Figure 2:
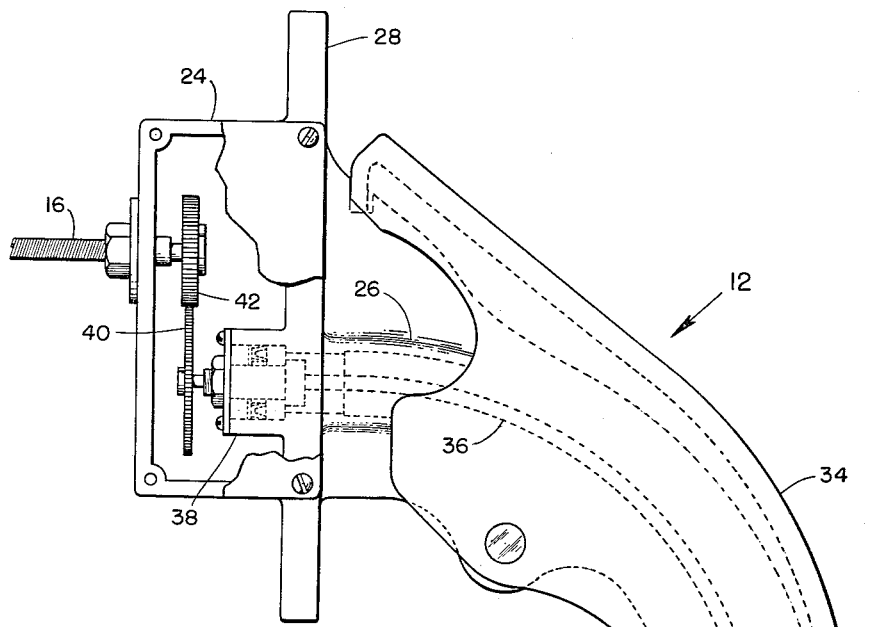
FIGS. 2, 3 and 4 are enlarged fragmentary views partially in section of the measuring apparatus illustrated in FIG. 1.

Referring more particularly to FIGS. 1 and 2 of the drawings, there is shown a vertical conduit 10 for transporting a fluid solid in the direction indicated by the arrow. A primary measuring apparatus 12 is supported on the wall of the conduit 10 and is provided with a helical vane 14 rotatable by the fluid solid to produce rotation of a flexible shaft 16 extending exteriorly of the conduit 10.

A suitable transducer such as a pneumatic mechanism 18, supplied with air under pressure from a conduit 20 and responsive to the speed of rotation of shaft 16, may be provided to produce a variable pneumatic pressure signal in a conduit 22 proportional to the flow rate. It will be apparent to those skilled in the art that various types of pneumatic, electrical and mechanical transducing mechanisms are available and may be used in place of the mechanism 18 I have shown for illustrative purposes. The shaft 16 may also be arranged to operate directly a suitable indicating device such as an integrating counter.

The primary measuring apparatus 12 comprises a hollow cup-shaped housing portion 24 and an integral curved tubular housing or sheath 26 extending from opposite sides of a supporting flange 28. The flange 28 is adapted to be attached by bolts or other suitable means (not shown), to one face of an adaptor 30, the other face of which is contoured to fit the exterior surface of conduit 10. A curved tapered U-shaped housing or shoe 34 is loosely mounted on sheath 26 by means of a pin 35 and serves to protect or shield the sheath 26 from the impact of the fluid solid flowing in the conduit 10.

A flexible shaft 36 (FIG. 2) extends through the hollow interior of the sheath 26. The upper end of the shaft 36 is carried in a bearing support 38 and terminates in an extension on which a gear 40 is mounted. A gear 42 meshes with gear 40. Thus, rotational movement of the shaft 36 is transmitted through gears 40 and 42 to shaft 16. The lower end of shaft 36 is supported by a second bearing support 44 mounted in the lower end of sheath 26 and is operatively connected to the vane 14 to be rotated therewith.

Figure 3:
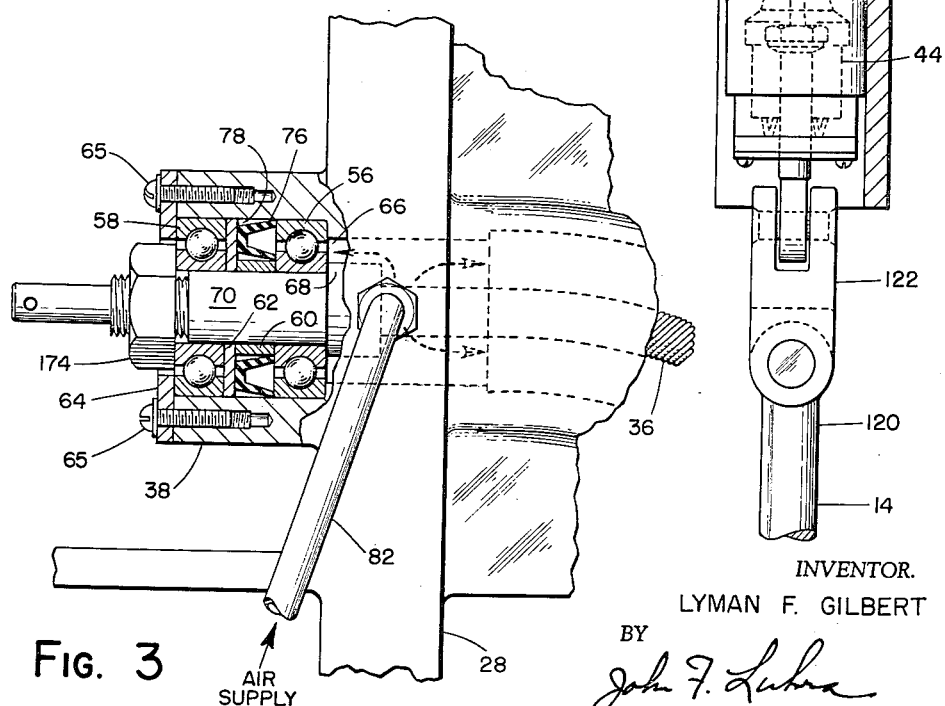

As shown in detail in FIG. 3, the bearing support 38 is formed integrally with flange 28 and houses a pair of ball bearing assemblies 56 and 58. These assemblies are of conventional construction having inner and outer raceways separated by steel balls as shown. The two assemblies 56 and 58 are separated in spaced relationship by spacer rings 60 and 62 and have their outer raceways engaging the inner periphery of bearing support 38. A retainer 64 is attached by screws 65 to the end of bearing support 38 to clamp the outer raceways into engagement with a shoulder 66 formed in the flange 28.

The flexible shaft 36 is provided with a collar 68 which may comprise an integral part or a separate suitably connected part. A rigid bearing shaft 70 attached to the flange 68 extends through the bores of the inner raceways of bearing assemblies 56 and 58 and carries the extension on which the gear 40 is mounted. A nut 74 is threaded on the bearing shaft 70 in engagement with the inner raceway of bearing assembly 58 to draw the collar 68 into engagement with the inner raceway of bearing assembly 56 thereby clamping the two inner raceways and spacer rings to the bearing portion 70. This assembly is thus rotatable on the balls relative to the outer raceways of the two bearing assemblies.

To provide for sealing against dust and other particles, the bearing support 38 is provided with an annular U-cup packing 76 which is positioned in an annular recess 78 between spacer 60 and inner surface of bearing support 38.

To facilitate and supplement the sealing action of packing 76 air under pressure is supplied from conduit 20 (FIG. 1). More particularly, air under pressure from conduit 20 is supplied by way of a conduit 82 containing a pressure reducing valve 84 (FIG. 1) to the space between the flexible shaft 36 and sheath 26. The open ends of the packing 76 span the annular space between the two raceways of ball bearing assembly 56 which is in communication by means of the space around the collar 68 with conduit 82. The side walls of the packing 76 are held open under the influence of this air pressure into engagement with the inner peripheral surface of bearing support 38 and spacer ring 60 to form a seal.

The packing 76 and associated parts are preferably arranged so that a small amount of air leakage will occur around the packing, through the space between the raceways of ball bearing assembly 58, and around clamping plate 64 to atmosphere. This air leakage maintains a continuous air purge through the bearing support 38 to maintain the interior thereof at a pressure slightly above atmospheric pressure. As a result the infiltration of dust and other foreign matter is substantially prevented.

Figures 4, 5:
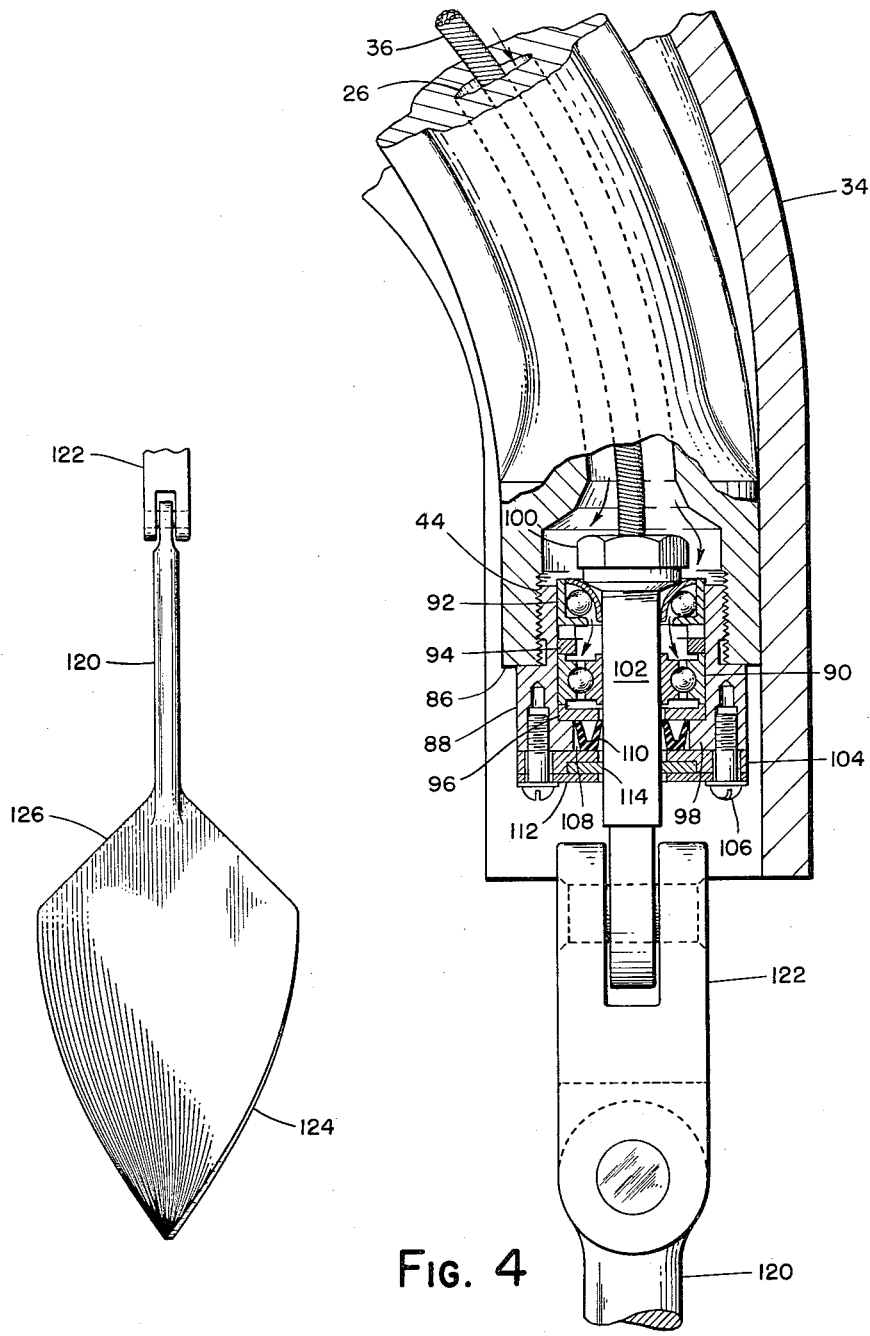
FIG. 5 is a side view of the helical vane taken at 90° from the illustration of the vane shown in FIG. 1.

The lower bearing support 44 as depicted in detail in FIG. 4 comprises similar ball bearing assemblies. More particularly, the lowermost portion of the sheath 26 is expanded in diameter and engaged by shoe 34. A tubular extension 88 has one end threaded in the end of sheath 26 to provide support for the bearing assembly now to be described.

A pair of ball bearing assemblies 90 and 92 are positioned within the bore of extension 88 and separated by a spacer 94. A second lower spacer 96 is positioned between the outer raceway of bearing assembly 90 and lower flanged end 98 of extension 88. The lower end of flexible shaft 36 terminates in a collar 100 to which is attached a rigid bearing shaft 102 and on which are mounted the inner raceways of bearing assemblies 90 and 92. The lower end of shaft 102 extends exteriorly of the shoe 34. The upper bearing assembly 92 forms an end thrust bearing as it has an L-shaped outer raceway and a curved inner raceway. Thus, upper bearing assembly 92 absorbs the downward thrust forces while lower bearing assembly 90 absorbs any radial forces.

A retaining flange 104 is attached to the lower end of the extension 88 by screws 106 to define an annular recess 108 in which is positioned a U-cup packing 110 identical to the packing 76 illustrated in FIG. 3.

To complete the lower bearing support a retaining ring 112 is clamped to the lower surface of flange 104 and retains an annular ring 114 of fibrous material such as felt in an annular recess in the lower surface of flange 104. The felt material contacts the bearing shaft 102 during rotation thereof and thus aids in preventing filtration of dust into the bearing assembly.

Air under pressure is supplied to the lower bearing support 44 through the hollow interior of sheath 26 to effect a continuous purging action identical to that achieved in the upper bearing support 32. Air will flow through the spaces between the inner and outer raceways of the ballbearing assemblies and into the packing 110. As a result the packing 110 will be expanded under the influence of the air pressure into engagement with the shaft extension 102 and extension 88 to substantially seal the lower bearing assembly from the exterior atmosphere. However, some air leakage will occur around the packing 110, through the felt material 114 and into the conduit 10. Thus, a continuous air purge of the lower bearing assembly 44 is accomplished to substantially eliminate infiltration of dust and other foreign matter. The felt material 114 facilitates this action by providing a physical obstruction to the infiltration of large particles.

In operation of the structure thus far described, the reducing valve 84 is adjusted to establish a positive air pressure within the sheath 26. The required pressure may vary with the size of the bearing assemblies. In one model tested a pressure of 5 p.s.i. was sufficient to achieve the desired purging action when the conduit 10 was at atmospheric pressure. In general the reducing valve 84 should be adjusted to establish a pressure in sheath 26 at least 2 or 3 p.s.i. greater than the conduit pressure.

The reducing valve 84 when adjusted in the manner suggested above is effective to maintain a constant positive air pressure in the bearing assemblies and expand the packing 76 and 110 as hereinbefore described. The air leakage around the packings effect a continuous air purge of both bearing assemblies preventing the infiltration of dust and other matter.

The air purge of lower bearing assembly 44 is especially important due to the location of the same in conduit 10. When the flowing medium is coal extreme dust and dirt conditions exist which have in many instances resulted in clogging and failure of the bearings in prior art devices. The air purge provided in the present invention however is adequate to substantially eliminate the infiltration of coal particles resulting in long trouble free service.

Figure 6:
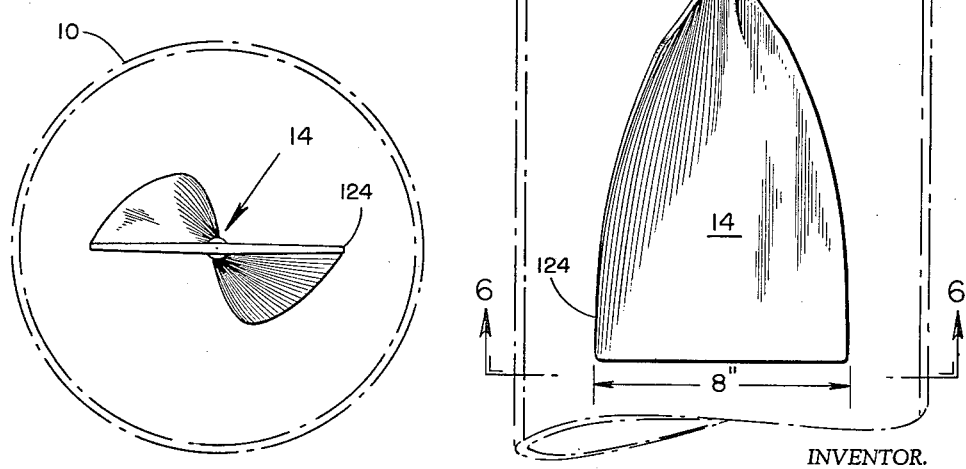
FIG. 6 is an end view of the vane shown in FIG. 1.

Referring now to the vane 14 (FIGS. 1, 5 and 6), this member is preferably cast from manganese steel and has a helical configuration. It is provided with a stem 120 of substantial length the upper end of which is connected to the lower end of the shaft extension 102 by a universal or double swivel joint 122. The lower portion or blade 124 of the vane is of rectangular configuration and is joined to the stem 120 by a sharply tapered upper portion 126. The entire vane comprising portions 124 and 126 is given a helical twist to establish a predetermined pitch which is effective to cause rotation of the vane 14 in response to the flow of coal or other fluid solid in conduit 10.

If stem 120 was eliminated and the vane 14 connected directly to the universal joint 122 build-up of the fluid solid on the surface of the vane would occur at the upper portion 126 as a result of the low velocity region created immediately below the end of the shoe 34. This effect is eliminated through the provision of stem 120 which permits positioning of the vane at a downstream point whereby the shearing force of the particles on the vane surface is maximum. Thus, a self-cleaning action is obtained.

Another feature of the vane 14 is the particular dimensions employed which differ substantially from those employed in prior art devices of this nature. In the past vanes of this type have been constructed with narrow width and relatively long lengths as shown in U.S. patent to Bailey 1,425,936 under the theory that the longer length will produce a higher torque and that the small width will reduce the flow resistance to a minimum. I have discovered, however, that the torque produced on the vane increases with length until a maximum value is reached whereupon the torque remains constant for further increases in length. In addition I have discovered that frictional forces or the flow resistance is proportional to the square of the length resulting in a large flow resistance with long vanes. Furthermore, I have discovered that substantially all of the rotational force applied to the vane is produced at the outer periphery or edge thereof, the central area having little effect on the torque. Accordingly the vane 14 is constructed with the blade portion 124 much shorter in length and much greater in width than found in prior art devices resulting in a substantial increase in efficiency.

One vane tested in a 16 inch conduit was constructed with a pitch of 40 inches and the following dimensions:

|  | Inches |
|---|---|
| Length of portion 124 | 10 |
| Width of portion 124 | 8 |
| Length of portion 126 | 4 |
| Length of stem 120 | 8 |

It was noted during the test of the above dimensioned vane and other vanes that optimum efficiency is obtained if the width to length ratio of blade portion 124 is approximately 4 to 5. As a further consideration the width should be substantially greater than the diameter of the end of shoe 26 to insure that the coal velocity at the outer edges of the vane where maximum torque is developed will be unaffected by the presence of shoe 34 in the conduit. It was also noted that the ratio of torque to flow resistance was maximum when the pitch was 40 inches and the length of portion 124 was 10 inches to produce a twist of one quarter turn.

While one embodiment of the invention has been herein shown and described, it will be apparent to those skilled in the art that many changes may be made in the construction and arrangement of parts without departing from the scope of the invention as defined in the appended claims.

What I claim as new and desire to secure by Letters Patent of the United States is:

1. A flow measuring apparatus for detecting and manifesting the flow rate of a flowing solid in a closed conduit comprising, a rotatable vane positioned within the conduit to be rotated at low velocities by the flowing solid, said vane comprising a generally rectangular shaped blade twisted to a predetermined pitch and having a small diameter stem of substantial length extending from said blade, said stem having a length equal to at least one third the length of said blade, a pneumatic device positioned exteriorly of the conduit responsive to rotation of said vane for producing a pneumatic pressure signal representative of the flow rate, a source of pneumatic pressure connected to said device, a housing extending through the wall of the conduit, a shaft extending through said housing and having one end operatively connected to said device and the other end thereof operatively connected to said vane stem for transmitting movement therebetween, bearings for said shaft mounted at each end of said housing, and means including a pressure reducing valve for connecting said pneumatic pressure source to said housing to establish a continuous air purge of said bearings.

2. A flow measuring apparatus for detecting and manifesting the flow rate of a flowing solid in a closed conduit comprising, a rotatable vane positioned within the conduit to be rotated at low velocities by the flowing solid, said vane comprising a rectangular shaped blade twisted approximately one-quarter of a turn over its length and having a width to length ratio of approximately four to five, a small diameter elongated stem having a length equal to at least one-third the length of said blade extending from one end of said blade, a manifesting device positioned exteriorly of the conduit responsive to rotation of said vane for producing a manifestation of the flow rate, a housing extending through the wall of the conduit, a shaft extending through said housing and having one end operatively connected to said stem and the other end operatively connected to said manifesting device for transmitting movement therebetween, a ball bearing assembly for said shaft mounted at each end of said housing for supporting said shaft, a flexible packing associated with each of said bearing assemblies to seal said bearing assemblies, and means for supplying air under pressure to said housing to establish a pressure higher than atmospheric pressure within said housing to expand said packings and facilitate the sealing action thereof and to establish a continuous air purge of said bearings.

3. A flow measuring apparatus for detecting and manifesting the flow rate of a flowing solid in a closed conduit comprising, a curved tubular housing having one end supported on the wall of the conduit and the other end thereof tapering to a small diameter and terminating at the center of the conduit in coaxial relationship therewith, a rotatable, flexible drive shaft extending through said housing, bearing assemblies at the opposite ends of said housing for supporting said drive shaft, a manifesting device positioned exteriorly of the conduit operatively connected to one end of said drive shaft for manifesting the flow rate of flowing solid within the conduit, a rotatable vane positioned within the conduit to be rotated at low velocities by the flowing solid, said vane comprising a generally rectangular shaped blade and having a width equal to at least two times the diameter of said other end of said tubular housing, said blade having a width to length ratio of approximately four to five and twisted approximately one-quarter of a turn over its length to establish a pitch of approximately forty inches, a small diameter stem extending from said blade having a length equal to at least one-third the length of said blade, said stem being operatively connected to the other end of said shaft, and means for supplying air under pressure to said housing to establish a continuous air purge of said bearings.

4. A vane assembly to be mounted within a conduit containing a flowing solid comprising, a tubular housing supported on the wall of the conduit and having an end portion terminating within said conduit, a rotatable drive shaft extending through said housing, a bearing assembly at each end of said housing for supporting said drive shaft, a flexible packing associated with each of said bearing assemblies to seal the same, means including a pressure reducing valve for connecting said housing to a source of compressed air to establish a pressure within said housing greater than atmospheric pressure to expand said packings and facilitate the sealing action thereof and to establish a continuous air purge of said bearing assemblies, a rotatable vane positioned in the conduit comprising a substantially rectangular shaped blade twisted approximately one-quarter of a turn over its length to a pitch of approximately forty inches, said blade having a width equal to approximately one half the diameter of the conduit and two times the diameter of the housing end portion and having a width to length ratio of approximately four to five, an elongated stem having a length equal to at least one-third the length of said blade formed integral with said blade and extending therefrom, said stem having the end thereof operatively connected to said shaft to position said blade in spaced relationship with the end of said housing to cause the flowing solid to exert a shearing force on the entire surface of said blade to substantially prevent the buildup of solid particles on the surface of said blade.

References Cited in the file of this patent

UNITED STATES PATENTS

| 808,150 | Fristoe | Dec. 26, 1905 |
| 1,425,936 | Bailey | Aug. 15, 1922 |
| 1,718,293 | Hoover | June 25, 1929 |
| 2,234,777 | Puffer | Mar. 11, 1941 |
| 2,682,991 | Craig et al. | July 6, 1954 |